April 1, 1947.  J. DWORKOWSKI ET AL  2,418,338
METHOD OF AND APPARATUS FOR TREATING TOOLS
Filed June 17, 1944  2 Sheets-Sheet 1
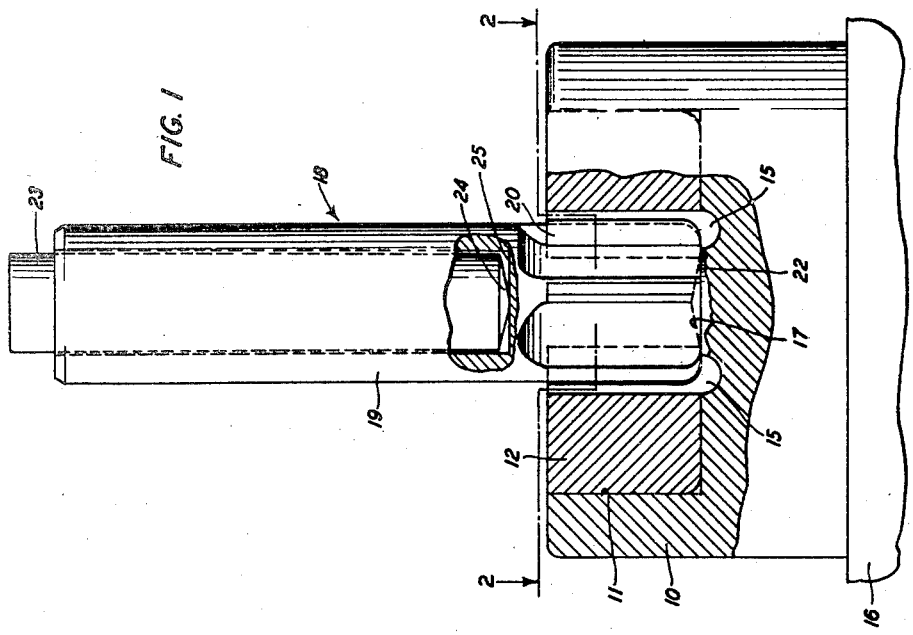
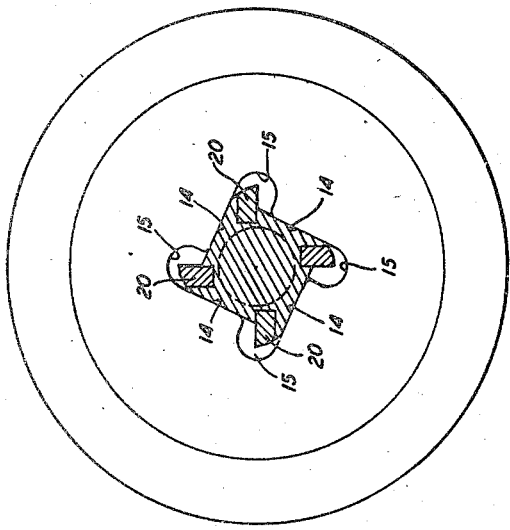
INVENTORS J. DWORKOWSKI
J. E. QUIGLEY
BY
E. R. Nowlan
ATTORNEY April 1, 1947.  J. DWORKOWSKI ET AL  2,418,338
METHOD OF AND APPARATUS FOR TREATING TOOLS
Filed June 17, 1944  2 Sheets-Sheet 2
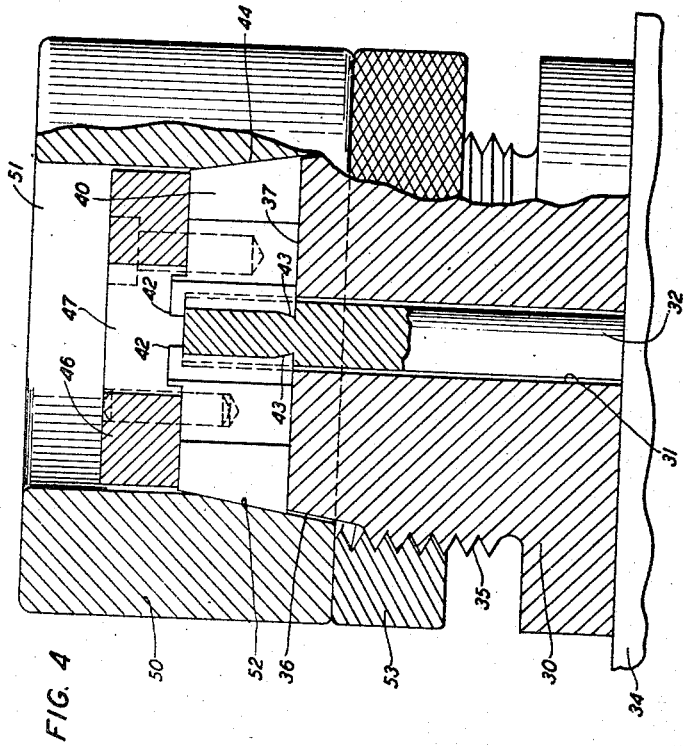
FIG. 4
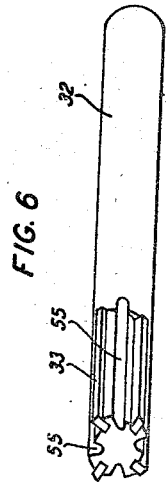
FIG. 6
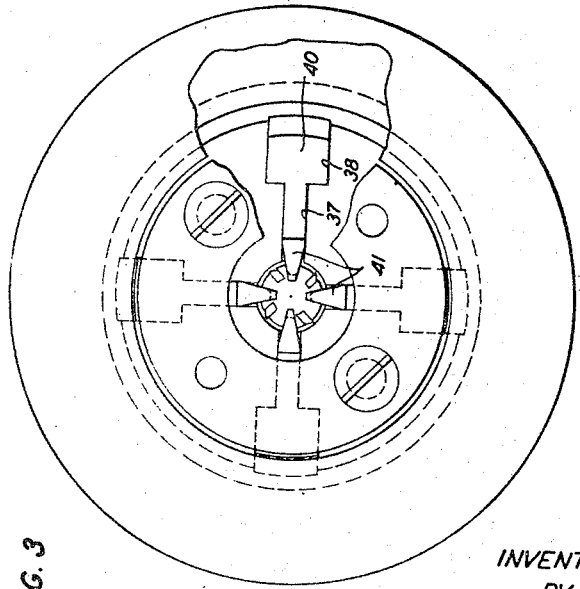
FIG. 3
FIG. 5
INVENTORS J. DWORKOWSKI
BY J. E. QUIGLEY
E. R. Nowlan
ATTORNEY Patented Apr. 1, 1947

2,418,338

UNITED STATES PATENT OFFICE 2,418,338

METHOD OF AND APPARATUS FOR TREATING TOOLS

John Dworkowski, Elizabeth, and James E. Quigley, Fanwood, N. J., assignors to Western Electric Company, Incorporated, New York, N. Y., a corporation of New York Application June 17, 1944, Serial No. 540,874

1 Claim. (Cl. 76—101)

This invention relates to method of and apparatus for treating tools, more particularly reamers.

Reamers, formed with soft metal shanks with hard metal cutting teeth inserted therein, must occasionally be sharpened for continued use. It is important also that the size of the reamer or tool be maintained accurately, which is difficult when it is necessary to grind the teeth to sharpen them.

Objects of the invention are to provide a simple, efficient and highly practical apparatus by the aid of which the method may be practised for treating tools, particularly reamers.

With this and other objects in view, the invention comprises an apparatus by the aid of which the method may be practised for varying the contour of a metal shank of a tool supporting cutting teeth to move the teeth outwardly like distances.

Other objects and advantages will be apparent from the following detailed description when considered in conjunction with the accompanying drawings, wherein Fig. 1 is a front elevational view partially in section of one species of the invention;

Fig. 2 is a horizontal sectional view taken along the line 2—2 of Fig. 1;

Fig. 3 is a top plan view of another species of the invention, a portion thereof being broken away;

Fig. 4 is a vertical sectional view of the structure shown in Fig. 3, portions thereof being shown in elevation;

Fig. 5 is a perspective view of a tool prior to being treated, and

Fig. 6 is a perspective view of the tool shown in Fig. 5 after it has been treated.

Referring now to the drawings, attention is first directed to Figs. 1 and 2, which illustrate a body member 10 having a hollow portion or cavity 11 formed to receive a control element 12. The element 12 has a contour or central aperture of the contour illustrated in Fig. 2, providing retaining walls 14 disposed successively at right angles with respect to each other, arcuate recesses 15 being disposed adjacent the corners thereof as shown. The body member 10 may be disposed upon a suitable support 16 when in use. The raised bottom portion of the cavity in the body member is substantially conical, as indicated at 17, for the purpose hereinafter described.

In the present embodiment a tool indicated at 18 has a hollow shank 19, the hollow portion terminating short of the material working end thereof in which hardened metallic teeth 20 are partially embedded as illustrated in Fig. 2. Preferably the shank 19 is formed of unhardened steel, while the teeth are formed of tungsten carbide or other suitable materials of this type. The end of the shank 19 has a concaved or substantially conical recess 22 therein to substantially conform to the upper surface of the portion 17. A member 23, receivable in the hollow portion of the shank 19, has a substantially conical end 24 to engage a normally flat end or bottom 25 of the cavity in the shank.

In carrying out the method through the aid of this structure the tool 18 may be disposed as illustrated, with its material working end in the cavity of the element 12, the flattened sides thereof engaging the retaining walls 14 as shown in Fig. 2. By the application of suitable force upon the member 23, the material of the shank, at the material working end thereof, will be disturbed. However, through the aid of the surfaces or walls 14 and 17, this disturbance will cause a flow of the material of the shank outwardly only at the recesses 15 in which the cutting teeth 20 are disposed. The force, being supplied at the axis of the cutter, will cause uniform outward flowing of the material in which the teeth 20 are disposed, thus enlarging the overall diameter of the tool at the material working portion thereof. In this manner a tool which has been worn through use is reconditioned, providing additional or increased tooth structures which may be ground or sharpened to the original dimensions.

Considering now the species shown in Figs. 3 to 6 inclusive, there is provided a body 30 centrally apertured, at 31, to receive a tool 32. In this embodiment the tool 32 is provided with a solid shank having cutting teeth 33 partially embedded in the material working end of the tool. Excepting that the tool 18 has a hollow shank and this tool has a solid shank, they are substantially identical in structure, the shanks being formed of unhardened steel which may, in comparison with the teeth, be termed a soft metal, while the teeth which are brazed in the pockets of the shanks are formed of tungsten carbide or other like materials.

The body 30 normally rests upon a support 34 and has a threaded portion 35 which begins near the center thereof, the upper portion of the body being tapered, as at 36, with a substantially truncated cone contour. Notches 37, with widened portions 38, are formed at equally spaced positions in the upper portions of the body 30 for receiving material working elements 40 of the cross-sectional contours illustrated in Fig. 3. Inner portions 41 of the elements 40 are tapered as shown, providing projections 42 (Fig. 4) adapted to extend over the upper end of the tool 32 when disposed within the body. The lower portions of the material working ends extend inwardly as at 43 (Fig. 4) for a purpose hereinafter described. The outer edges or surfaces 44 of the elements 40 are arcuate in cross-section to conform to the general contour of the tapered portion 36 of the body 30 and are also tapered vertically to further conform to this portion of the body. An annular retaining member 46 is mounted upon the upper end of the body 30, to normally hold the elements 40 against displacement and to cooperate with their projections 42, which are disposed in a central portion 47 of the member 46, to control their outer movements.

The elements 40 are moved inwardly simultaneously and like distances through the aid of a member 50 which is annular in general contour, having a central cavity 51 which tapers outwardly, as at 52, from substantially its central portion to its lower end thereof. A control member 53 in the form of a knurled nut disposed upon the threaded portion 35 of the body, serves as a stop for the downward movement of the member 50, to control the inward movement of the elements 40 thereby.

In carrying out the method through the aid of this embodiment of the invention, the member 50 is normally removed from the body 30, and to begin the forming operation a tool 32, as illustrated in Fig. 5, is disposed in the aperture 31 of the body, the material working end of the tool including the teeth 33 being disposed between the group of elements 40. At this time the elements 40 are in their outermost positions, and if this is the first time the tool is being treated, the control member 53 is positioned on the portion 35 so that the elements 40 may be moved inwardly a desired limited distance. The member 50 is then disposed upon the body. Through the aid of a suitable force applied thereto the elements 40 will be moved inwardly simultaneously, causing the portions 43 thereof to first pierce the shank of the tool, and eventually the full length of each element will cause displacement of the material of the shank. This displacement or flowing of the material will cause the intermediate portions thereof as illustrated in Fig. 3, which carry the teeth 33, to flow outwardly like distances. This outward flow of the material at the cutting teeth, under the control of the inner ends of the elements 40, may be increased with each series of method steps for each successive requirement for reconditioning the tool.

An extreme illustration is shown in Fig. 6, where the longitudinal grooves 55 have been formed in the shank between the teeth 33, causing the portions of the shank carrying the teeth to be moved outwardly to increase the effective diameter of the tool supporting the teeth so that they may be successively sharpened for continued use. For these successive treatments of the tool the control member 53 may be moved downwardly further distances until the extreme or final distance has been reached. The member 50 may thus be moved downwardly further distances relative to the body 30, causing the elements 40 to move inwardly increased distances simultaneously to uniformly vary the contour of the material working end of the tool during each successive series of method steps for treating the tool.

Although specific improvements of the invention have been shown and described, it will be understood that they are but illustrative and that various modifications may be made therein without departing from the scope and spirit of this invention as defined by the appended claim.

What is claimed is:

The method of reconditioning a tool having an elongate soft metal body supporting radially projecting hard metal or metallic carbide cutting members, with cutting edges, brazed in spaced recesses in the body parallel with the axis of the body, the method comprising applying a force axially of the body to cause an outward flow of the soft metal thereof adjacent the cutting members radially of the axis of the body to increase the cutting portion of the tool beyond its original size for subsequent grinding of the cutting members to sharpen the tool to its original size, holding areas of the body between the cutting members against outward radial flowing of the soft metal, and directing the flow of the soft metal supporting the cutting members outwardly uniformly to force the cutting members radially outwardly like distances.

JOHN DWORKOWSKI.
JAMES E. QUIGLEY.

REFERENCES CITED

The following references are of record in the file of this patent:

UNITED STATES PATENTS

| Number | Name | Date |
|---|---|---|
| 874,448 | Smith | Dec. 24, 1907 |
| 1,475,939 | Ditson | Dec. 4, 1923 |
| 2,112,645 | Bedford | Mar. 29, 1938 |
| 840,578 | Morrison | Jan. 8, 1907 |
| 1,814,516 | Larson | July 14, 1931 |
| 1,788,463 | Kappel | Jan. 13, 1931 |
| 874,448 | Smith | Dec. 24, 1907 |
| 632,862 | Arnold | Sept. 12, 1899 |
| 737,853 | Gardner | Sept. 1, 1903 |
| 1,858,733 | Flachbart | May 17, 1932 |

FOREIGN PATENTS

| Number | Country | Date |
|---|---|---|
| 368,287 | British | 1932 |
| 315,315 | German | Nov. 4, 1919 |